United States Patent [19]
Bailey et al.

[11] Patent Number: 5,226,938
[45] Date of Patent: Jul. 13, 1993

[54] SEPARATOR ASSEMBLY

[75] Inventors: William Bailey, Bolton; Antonio Loura, Wethersfield, both of Conn.

[73] Assignee: The Spencer Turbine Company, Windsor, Conn.

[21] Appl. No.: 810,216

[22] Filed: Dec. 19, 1991

[51] Int. Cl.⁵ .................. B01D 29/15; B01D 29/62
[52] U.S. Cl. .................. 55/305; 55/341.1; 55/366; 55/429; 55/439; 55/472
[58] Field of Search .............. 55/304, 305, 341.1, 55/341.2, 366, 428, 429, 433, 436, 439, 465

[56] References Cited

U.S. PATENT DOCUMENTS

| | | | |
|---|---|---|---|
| 463,184 | 11/1891 | Batchman | 55/305 |
| 2,535,963 | 12/1950 | Sisemore | 55/429 |
| 2,790,509 | 4/1957 | Share | 55/305 |
| 3,208,202 | 9/1965 | Herubel | 55/366 |
| 3,561,824 | 2/1971 | Homan | 55/429 X |
| 3,653,190 | 4/1972 | Lee et al. | 55/341.2 X |
| 3,853,517 | 12/1974 | Mitchell | 55/366 X |
| 3,910,781 | 10/1975 | Bryant, Jr. | 55/305 |
| 4,242,114 | 12/1980 | Deacon | 55/304 |
| 4,655,806 | 4/1987 | Bowersox | 55/341.2 |
| 4,680,039 | 7/1987 | Revell | 55/341.1 |
| 4,735,639 | 4/1988 | Johnstone | 55/429 X |
| 4,868,949 | 9/1989 | Loveless et al. | 55/305 X |
| 4,874,410 | 10/1989 | Poor | 55/341.2 X |
| 5,089,037 | 2/1992 | Marsolais | 55/429 X |

Primary Examiner—Robert Spitzer
Attorney, Agent, or Firm—McCormick, Paulding & Huber

[57] ABSTRACT

A separator assembly includes a tubular bag separator having a cylindrical casing and supported in an axially vertical position by an upright stanchion mounted on an associated support base. The separator is used in combination with a disposable drum positioned under the separator. A manually operable jack elevates the separator and maintain it in a raised position above the height of an associated drum to facilitate drum removal and replacement. The stanchion is releasably retained in vertical position and foldable to a horizontally disposed position to facilitate transporting and storing the separator assembly.

20 Claims, 4 Drawing Sheets

SEPARATOR ASSEMBLY

BACKGROUND OF THE INVENTION

This invention relates in general to separators and deals more particularly with an improved separator assembly particularly adapted for use in combination with vacuum producing apparatus in a cleaning system for removing waste material from an air stream for disposal or recycling.

A typical vacuum cleaning apparatus employing a separator is illustrated and described in U.S. Pat. No. 4,874,410 to Poor for Vacuum Producing Apparatus, assigned to the assignee of the present invention. The tubular bag separator disclosed in the aforesaid patent includes a cylindrical casing defining a bag chamber containing inverted filter bags depending from a moveable bag head which comprises a part of a manually operable bag shaker mechanism. A dirt can cooperates with the casing to form a lower portion of the separator and has a diametrically enlarged rim flange which cooperates with a pivotally moveable bale for lifting the dirt can into and retaining it in sealing engagement with the lower end portion of the separator casing. Since the dirt can is specifically designed for use with the separator and forms an integral part of the separator, it is customary to use a disposable plastic liner with the dirt can. When the dirt can is full the liner containing dirt or other waste material is tied closed and removed for reclamation or disposal.

It is the general aim of the present invention to provide an improved stationary separator assembly of simple durable construction which has fewer parts than presently available separators of generally like kind for low cost manufacture and for use with standard disposable containers or drums of reclosable type to reduce handling of waste or recyclable material separated from an air stream by the separator assembly.

SUMMARY OF THE INVENTION

In accordance with the present invention a separator assembly is provided which comprises separating means for cooperating in assembly with an associated disposable drum of reclosable type having an open upper end. The separator means includes a casing for seating on the upper end of a drum, means for defining inlet and outlet openings communicating with the interior of the casing, and filter means within the casing for removing particulate material from an air stream flowing through the casing from the inlet opening to the outlet opening. The separator assembly further includes carrying means for supporting the separating means for vertical movement relative to a drum positioned below the separating means, and elevating means for raising the separating means to and maintaining the separating means in a vertically oriented position above the drum and for lowering the separating means into assembled seating engagement with the drum.

DETAILED DESCRIPTION OF PREFERRED EMBODIMENT

Figure 1:
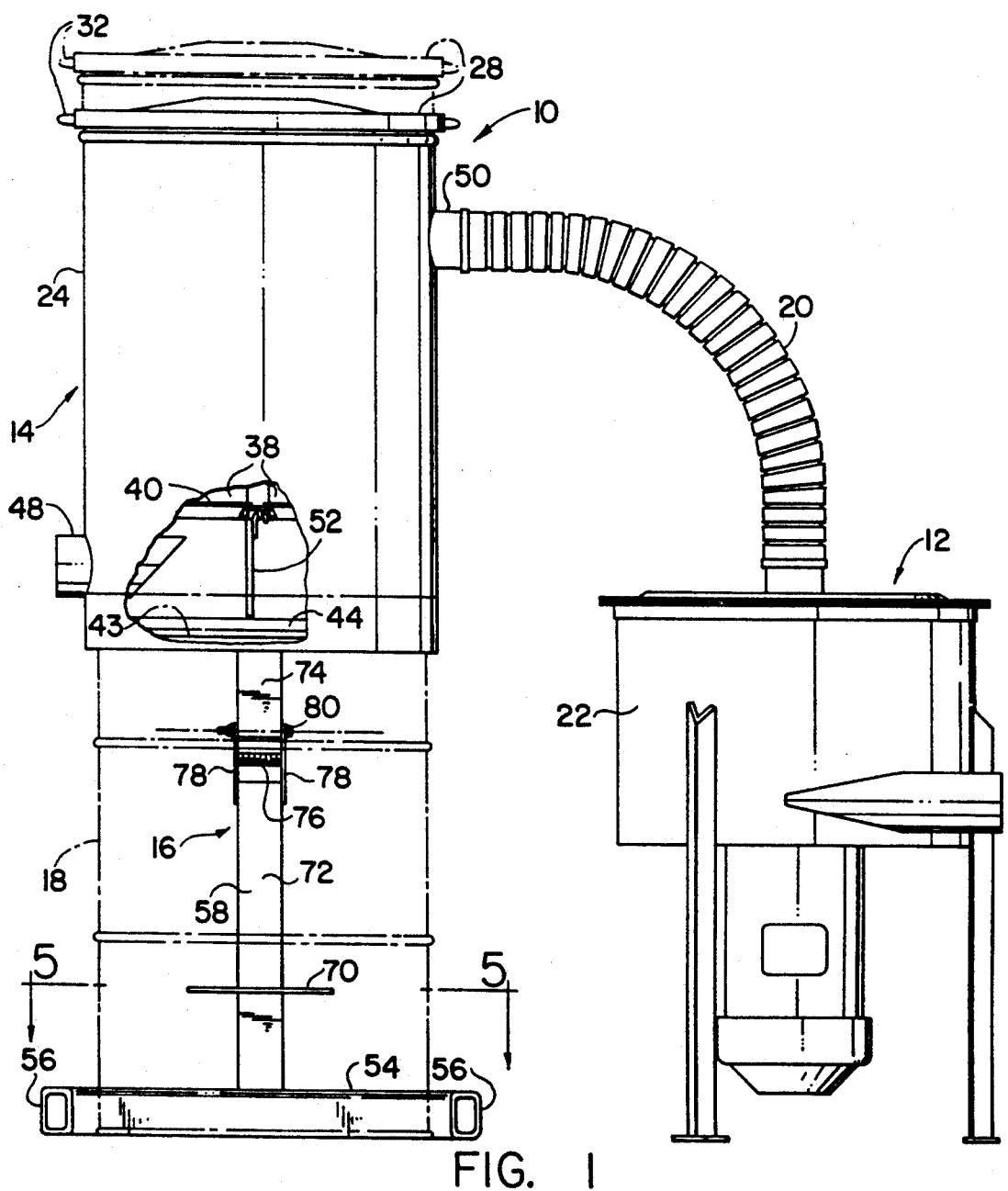
FIG. 1 is a front elevational view of a vacuum cleaning apparatus including a separator assembly embodying the present invention.

In the drawings and in the description which follows, a separator assembly embodying the present invention and indicated generally by the reference numeral 10 is illustrated and described with reference to a cleaning system which includes a vacuum producing apparatus shown in FIG. 1 and designated generally by the numeral 12. The illustrated separator assembly 10 includes a tubular bag separator indicated generally at 14 and an associated support or carrying assembly 16 and is particularly adapted for use in combination with a disposable dirt container or standard cylindrical drum shown in broken lines in FIG. 1 and indicated at 18. The separator 14 operates to remove entrained solid material from an air stream which enters the separator. In FIG. 1 the separator 14 is shown connected by a flexible hose 20 to the vacuum producer 12 which comprises a multistage blower 22 for evacuating air from the separator 14 to induce air flow through the separator in a manner well known in the art.

Figure 2:
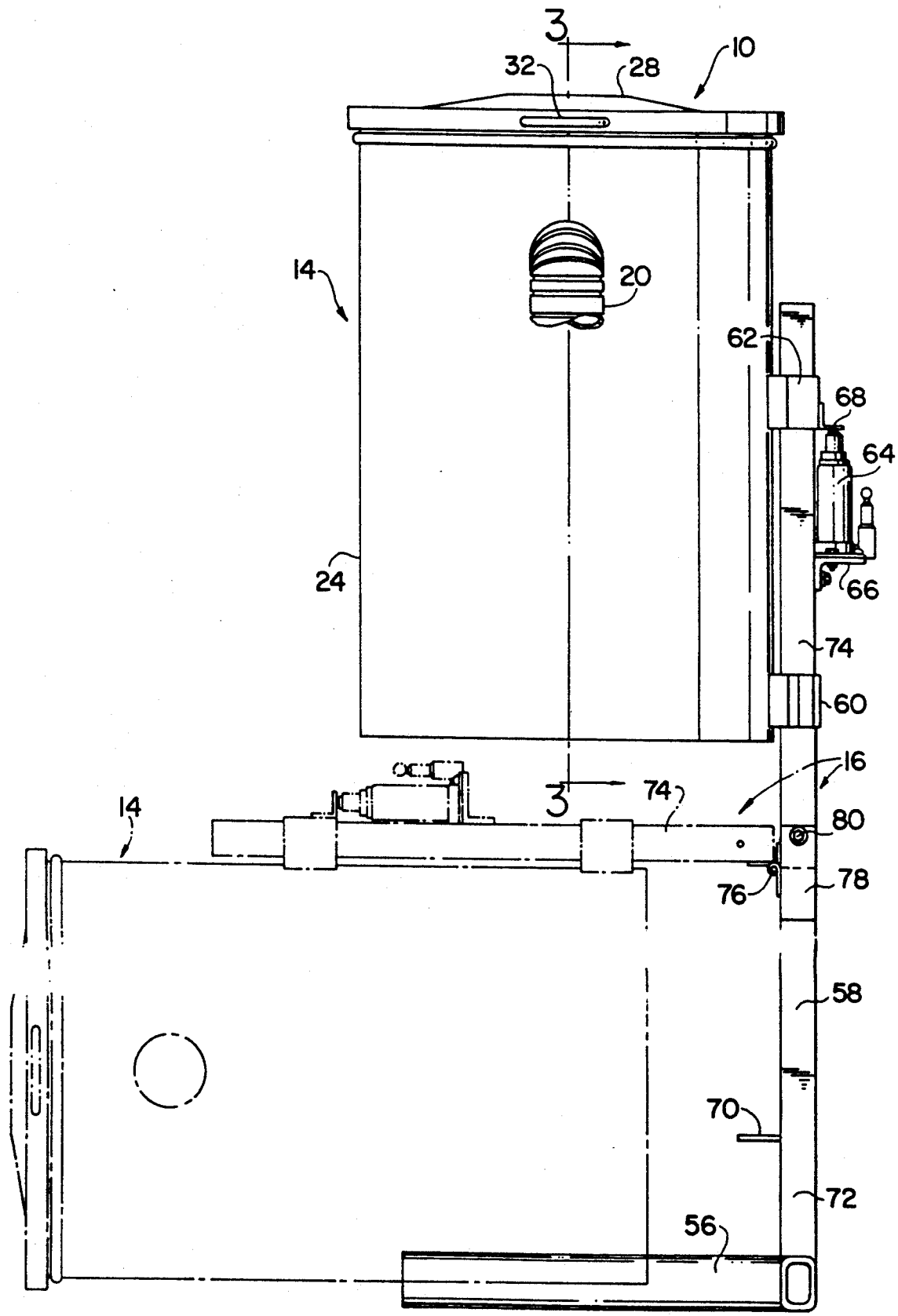
FIG. 2 is a somewhat enlarged side elevational view of the separator assembly shown in FIG. 1.
Figure 3:
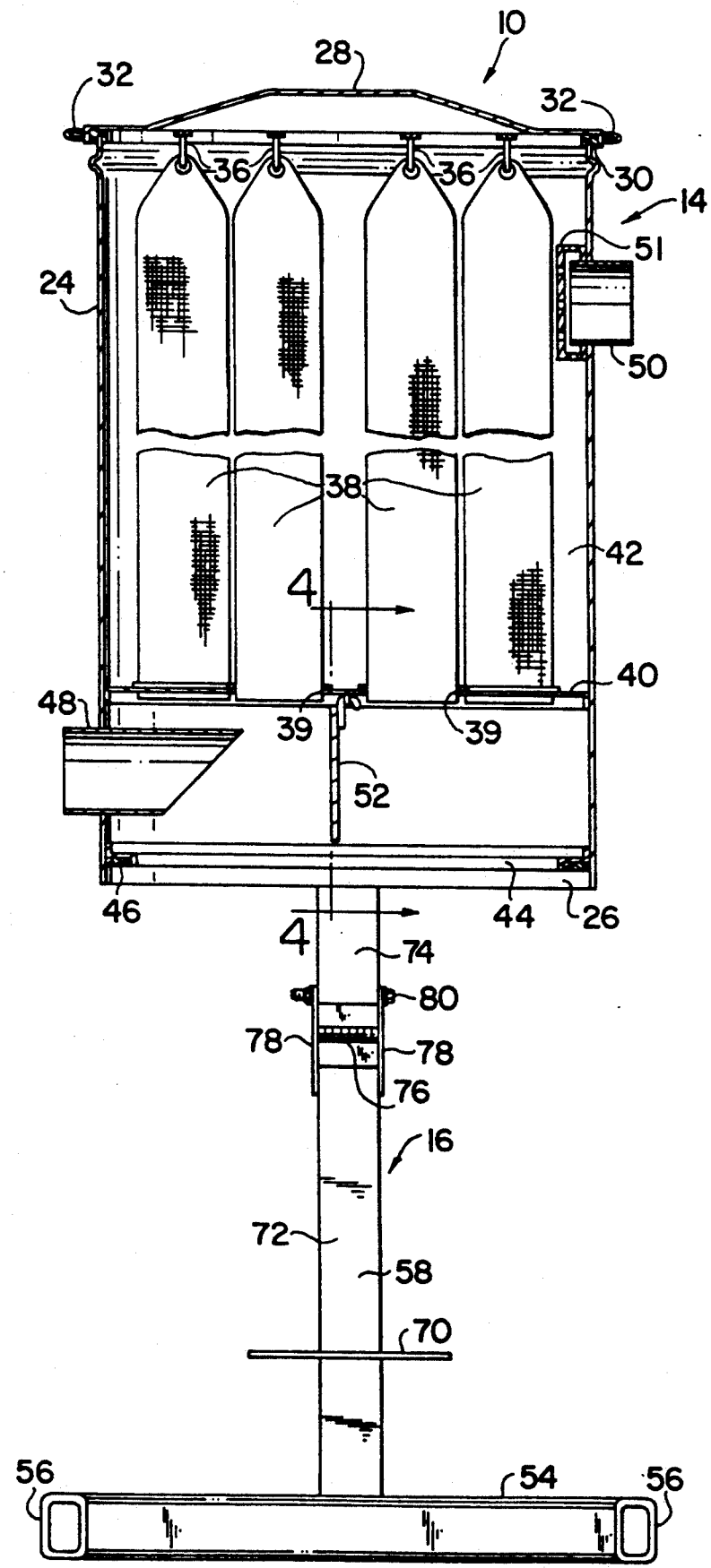
FIG. 3 is a sectional view taken along the line 3—3 of FIG. 2.
Figure 4:
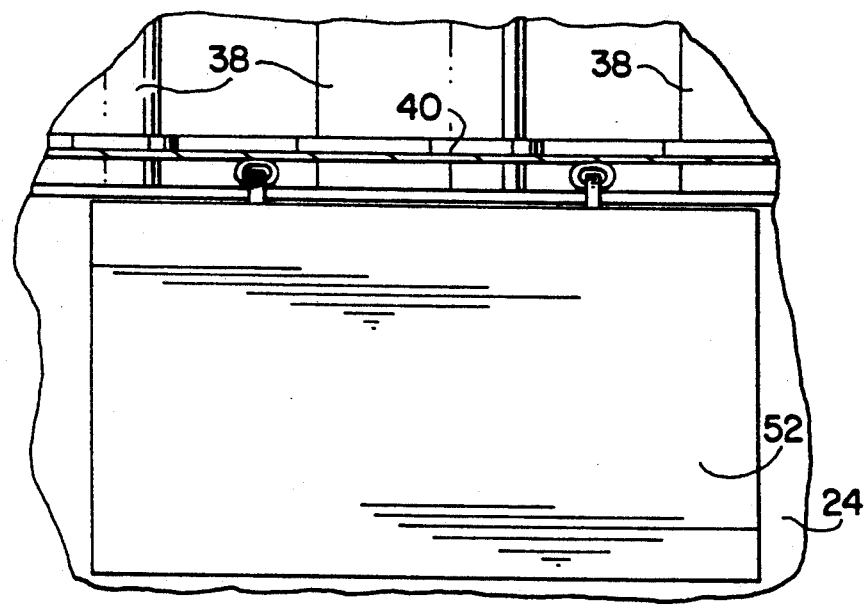
FIG. 4 is a somewhat enlarged fragmentary sectional view taken along the line 4—4 of FIG. 3.
Figure 5:
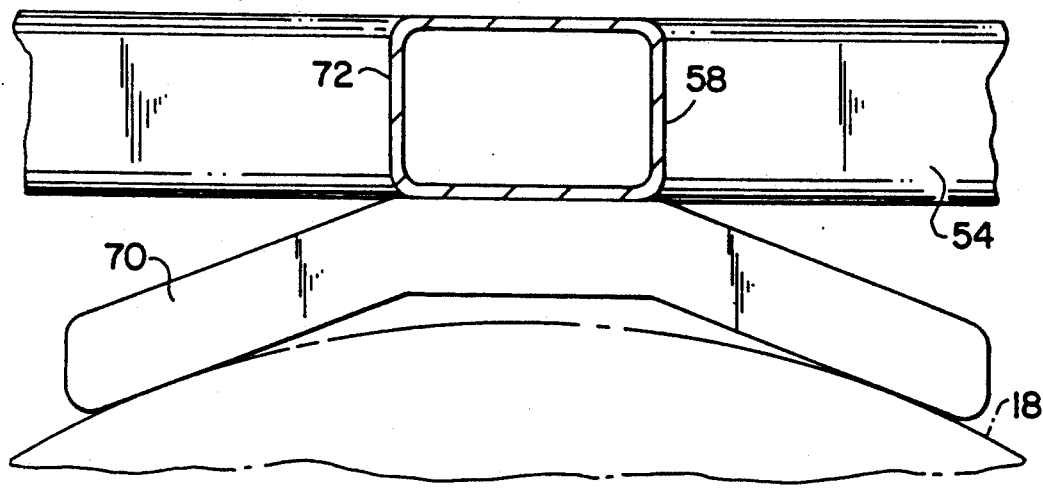
FIG. 5 is a somewhat enlarged fragmentary sectional view taken along the line 5—5 of FIG. 1.

Referring now more particularly to FIGS. 2 and 3 and considering the separator 14 in further detail, it includes a generally cylindrical casing 24 which has a circular opening 26 at its lower end. A removable cover 28 and an associated gasket 30 form an air tight sealed closure for the upper end of the casing, as best shown in FIG. 3. A pair of diametrically opposed shaker handles 32,32 are mounted on the cover 28, substantially as shown. A plurality of parallel spaced apart metal strips secured to and extending across the under side of the cover 28 carry a plurality of J hooks 36,36.

Figure 6:
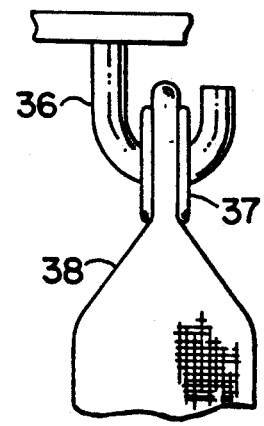
FIG. 6 is a somewhat enlarged fragmentary side elevational view showing a filter bag connection.

An axially elongate generally cylindrical porous filter bag 38 is suspended in inverted position from each J hook 36. Each filter bag 38 has a grommet 37 in its upper end which is received on an associated J-hook 36, substantially as shown in FIG. 6. The downwardly open lower end of each filter bag is received and retained within an associated aperture 39 in a radially disposed bag head plate 40 mounted in fixed position within the lower portion of the casing. The bag head plate 40 cooperates with the filter bags 38,38 and the upper portion of the casing 24 to define a bag chamber 42 in the upper portion of the separator 10.

As previously noted, the separator 10 is adapted for use in combination with a disposable barrel or drum, such as the drum 18 shown in FIG. 1, and more specifically a reclosable cylindrical drum having an annular rim or chime 43 (FIG. 1) defining a circular opening at the upper end of the drum. The opening 26 at the lower end of the casing has a slightly larger major diameter than the chime 43 on the drum with which the separator is used. An annular dirt can ring 44 coaxially supported within the lower end portion of the casing 24 is welded or otherwise suitably secured to the inner wall of the casing. The dirt can ring cooperates with the casing inner wall to define a downwardly open annular recess which contains a complimentary gasket 46 for seating engagement with the chime 43 on an associated drum, such as the drum 18, when the separator 10 is mounted on or assembled with the drum, substantially as shown in FIG. 1.

A tubular inlet conduit 48 attached to the casing 24 extends radially into the casing below the bag head plate 40 to provide a radially inwardly directed air flow path into the lower portion of the separator 10. The conduit 48 extends for some distance both inwardly and outwardly beyond the casing 24 and is bias cut at its inner end to open downwardly and in the direction of the opening 26 throughout a substantial portion of its length. An outlet conduit 50 extends through the wall of the casing 24 above the bag head plate 40, communicates with the chamber 42, and extends outwardly beyond the casing a sufficient distance to facilitate connection with the flexible hose 20. A perforated guard cover or screen 51 is mounted on the inner end of the outlet conduit 50 to prevent filter bags from being sucked into the outlet conduit.

The multi-stage blower 22 draws air from the separator assembly 12 through the outlet conduit 50 which produces a vacuum within the chamber 42 causing air to be drawn into the separator assembly through the inlet conduit 48. The capacity of the blower 22 is sufficient to enable the system to pick up relatively heavy solid material, such as sand or grit, which may, for example, be encountered in a vacuum cleaning system for a car wash or the like. Consequently, a replaceable target plate 52 is suspended from the lower surface of the bag head plate 40 by a pair of hooks which engage associated eyes welded or otherwise secured to the lower surface of the bag head plate. The replaceable target plate 52 is disposed in the path of incoming air from the inlet conduit 48, substantially as shown in FIG. 3.

The separator 10 is designed to operate with the casing 24 in an upright or axially vertical position and is maintained in spaced relation to an associated support surface, such as a floor surface, by the carrying assembly 16. The presently preferred carrying assembly 16 is fabricated from metal tubing of non-circular cross section and includes a main base member 54 and a pair of legs 56,56 which project horizontally outward in parallel relation to each other from opposite ends of the main base member. The legs 56,56 are spaced apart a distance greater than the base diameter of a drum 18 to receive a drum therebetween. The carrying assembly further includes a stanchion 58 which is welded or otherwise secured to the main base member 54 and extends vertically upwardly from it. A pair of mounting brackets 60 and 62 welded or otherwise secured to the casing 24 in vertically spaced relation to each other and slidably received on the stanchion 58 support the separator 10 for vertical sliding movement along the stanchion between a lowered position and a raised position indicated, respectively, by full and broken lines in FIG. 1. A manually operable hydraulic jack 64 shown in FIG. 2 elevates the separator 10 to its raised position. The jack 64 is secured by fasteners to a support bracket 66 attached to the stanchion 58 between the mounting brackets 60 and 62. The jack, which may, for example, comprise a conventional hydraulic automotive jack, includes a piston and cylinder and acts between the support bracket 66 and a lifting bracket 68 mounted in fixed position on the upper support bracket 62. A centering guide 70 is mounted on the stanchion 58 between the base and the separator 12 to engage a drum, such as the drum 18, and aid in centering the drum below and generally in coaxial alignment with the separator 10 when the drum is moved into position under the separator and between the legs 56,56.

Occasionally, it may be necessary to move the separator or store it for a period of time and, for this reason, the illustrated carrying assembly 16 is arranged for selectively supporting the separator in a horizontally oriented position in the absence of a drum, such a position being shown in broken lines in FIG. 2. The illustrated stanchion 58 has a vertically disposed lower part 72 and an upper part 74 pivotally connected to the lower part for movement between vertically and horizontally disposed positions indicated in full and broken lines, respectively, in FIG. 2. The separator 14 is mounted on the upper part, substantially as shown. The upper part 74 is connected to the lower part 72 by a hinge 76. A pair of retaining members or plates 78,78 welded or otherwise suitably secured to opposite sides of the lower part 72 receive a fastener, such as the bolt 80, which passes through apertures in the plates 78,78 and in the upper part 74 to releasably retain the upper part in vertical alignment with the lower part 72 when the separator 14 is in its upright or operable position.

When the illustrated cleaning apparatus is in use a vacuum attachment or other suitable pickup accessory may be attached by a flexible hose to the inlet conduit 48. When the vacuum producer 12 is operated air is drawn into the separator through the inlet conduit 48. Heavy particles entrained in the air stream entering the separator through the inlet conduit 48 impinge upon the target plate 52 and drop into the drum positioned below the separator 14. The inverted filter bags trap essentially all material not separated by impingement upon the target plate. The efficiency of the separator is maintained by periodically dislodging excess dirt or bag cake from the filter media. Bag cleaning is accomplished by merely lifting one or both of the shaker handles 32 to raise the cover 28 and then releasing the handle or handles to allow the cover to fall to its closed position. This action will generally be sufficient to dislodge the dirt or bag cake which has accumulated on the filter bags. This simple arrangement eliminates the need for the bag shaker mechanism usually found on a separator of the type disclosed.

We claim:

1. A separator assembly comprising separating means for cooperating in assembly with an associated disposable drum having an open upper end, said separator means including a casing for seating on the upper end of the drum and having an open lower end for communicating with the open upper end of the drum, means for defining an inlet opening and an outlet opening in said casing communicating with the interior of said casing, and filter means within said casing for removing particulate material from an air stream flowing through said casing from said inlet opening to said outlet opening, carrying means for supporting said separating means in a first position for vertical movement to permit positioning of a drum below said separating means and for pivotal movement to a second position below said first position and for pivotal movement to a second position below said first position for transportation and storage, and elevating means for raising said separating means to and maintaining said separating means in a vertically oriented position above a drum positioned below said separating means and for lowering said separating means into assembled seating engagement with a drum positioned below said separating means.

2. A separator assembly as set forth in claim 1 wherein said elevating means comprises a manually operable jack cooperating with and acting between said carrying means and said separating means.

3. A separator assembly as set forth in claim 2 wherein said carrying means comprises a vertical stanchion and said jack is mounted on said stanchion.

4. A separator assembly as set forth in claim 3 wherein said jack is further characterized as an hydraulic automotive jack.

5. A separator assembly as set forth in claim 3 wherein said carrying means comprises a pair of vertical mounting brackets attached to said casing in vertically spaced apart relation to each other and slidably engaged with said stanchion and said jack is mounted on said stanchion between said brackets.

6. A separator assembly as set forth in claim 1 wherein said carrying means comprises a generally U-shaped horizontally disposed base having a main base member and a pair of spaced apart legs projecting horizontally from said main base member for receiving a drum therebetween and a vertically disposed stanchion projecting upwardly from said main base member intermediate said legs.

7. A separator assembly as set forth in claim 6 including guide means mounted on said stanchion for aiding in positioning of a drum below and in vertical alignment with said separating means.

8. A separator assembly as set forth in claim 1 wherein said casing has a removable cover defining a closure for the upper end of the casing and said filter means comprises a plurality of inverted filter bags secured to and depending from said cover.

9. A separator assembly as set forth in claim 8 wherein each of said filter bags is secured to said cover by an associated J-hook.

10. A separator assembly as set forth in claim 9 including a shaker handle attached to side of said cover.

11. A separator assembly as set forth in claim 1 wherein said assembly includes guide means mounted on said carrying means for engaging a drum positioned below said separating means to aid in aligning the drum with the separating means.

12. A separator assembly as set forth in claim 1 wherein said carrying means supports said separating means for pivotal movement about a generally horizontal axis and to said second position.

13. A separator assembly comprising a separator having a cylindrical casing open at one end for cooperating in seating engagement on the open upper end of a disposable drum, means for defining inlet and outlet openings communicating with the interior of said casing, a plurality of inverted filter bags disposed within and depending from said casing, carrying means for supporting said separator in an axially vertical position for vertical movement relative to a disposable drum positioned below said separator and for movement between said axially vertical position and a generally axially horizontal position and including an elongate stanchion having an axially vertical lower part and an upper part carrying said separator and connected to said lower part for pivotal movement between a first position wherein said upper part is axially vertically disposed and a second position wherein said upper part is generally axially horizontally disposed, and elevating means for raising and lowering said separator when said upper part is in its first position.

14. A separator assembly as set forth in claim 13 including means for releasably retaining said upper part in its first position.

15. A separator assembly as set forth in claim 14 wherein said elevating means comprises a manually operable jack.

16. A separator assembly as set forth in claim 15 wherein said carrying means includes upper and lower mounting brackets attached to said casing and engaged with said stanchion and said jack acts between said stanchion and one of said mounting brackets.

17. A separator assembly as set forth in claim 16 wherein said jack is mounted on said stanchion intermediate said upper and lower mounting brackets and is engaged with said upper mounting bracket.

18. A separator assembly comprising separating means for cooperating in assembly with an associated disposable drum having an open upper end, said separator means including a casing for seating on the upper end of the drum and having an open lower end for communicating with the open upper end of the drum, means for defining an inlet opening and an outlet opening in said casing communicating with the interior of said casing, and filter means within said casing for removing particulate material from an air stream flowing through said casing from said inlet opening to said outlet opening, carrying means for supporting said separating means for vertical movement relative to a drum positioned below said separating means and for selectively supporting said separating means in a horizontally oriented position in the absence of a drum, and elevating means for raising said separating means to and maintaining said separating means in a vertically oriented position above the drum and for lowering said separating means into assembled seating engagement with the drum.

19., A separator assembly as set forth in claim 18 wherein said carrying means comprises an elongate stanchion having a vertically disposed lower part of an upper part pivotally connected to said lower part for movement between vertically and horizontally disposed positions and said separating means is mounted on said upper part.

20. A separator assembly as set forth in claim 19 including retaining means for releasably securing said upper part in vertically disposed position relative to the lower part.

* * * * *